United States Patent
Ishihara et al.

(10) Patent No.: US 9,051,999 B2
(45) Date of Patent: Jun. 9, 2015

(54) CONTINUOUSLY VARIABLE TRANSMISSION

(75) Inventors: Yasuhiro Ishihara, Tokyo (JP); Masahiko Ando, Tokyo (JP); Brian Dutson, Leyland (GB)

(73) Assignees: KK EQUOS RESEARCH, Tokyo (JP); TOROTRAK (DEVELOPMENT) LIMITED, Lancashire (GB)

( * ) Notice: Subject to any disclaimer, the term of this patent is extended or adjusted under 35 U.S.C. 154(b) by 252 days.

(21) Appl. No.: 13/139,852

(22) PCT Filed: Dec. 16, 2009

(86) PCT No.: PCT/GB2009/051723
§ 371 (c)(1),
(2), (4) Date: Feb. 1, 2012

(87) PCT Pub. No.: WO2010/070341
PCT Pub. Date: Jun. 24, 2010

(65) Prior Publication Data
US 2012/0142483 A1   Jun. 7, 2012

(30) Foreign Application Priority Data
Dec. 16, 2008   (JP) .................................. 2008-319493

(51) Int. Cl.
*F16H 15/38* (2006.01)
*F16H 63/06* (2006.01)

(52) U.S. Cl.
CPC .............. *F16H 15/38* (2013.01); *F16H 63/062* (2013.01); *F16H 2015/383* (2013.01)

(58) Field of Classification Search
USPC .......... 475/214, 216, 217; 476/40, 41, 42, 44, 476/10
See application file for complete search history.

(56) References Cited

U.S. PATENT DOCUMENTS

2003/0083175 A1   5/2003   Haka et al.

FOREIGN PATENT DOCUMENTS

| JP | 2006292079 A | 10/2006 |
| WO | 03062670 A1 | 7/2003 |
| WO | 2005121602 A1 | 12/2005 |

(Continued)

OTHER PUBLICATIONS

International Search Report; International Application No. PCT/GB2009/051723; mailed Apr. 14, 2010.

(Continued)

*Primary Examiner* — Justin Holmes
*Assistant Examiner* — Stacey Fluhart
(74) *Attorney, Agent, or Firm* — Brooks Kushman P.C.

(57) ABSTRACT

A variator (2) having a pair of semi-toroidally recessed races (11, 12) mounted to a housing (6) for rotation about a common variator axis. A roller (14) is mounted between the races to transfer drive between them at a variable drive ratio. A sun gear (25) is mounted between the races, as is a ring (gear 26). The ring gear is radially outboard of the sun gear. Mounted between the sun and ring and meshing with both is a carrier gear (33) upon which the roller is mounted in a manner which enables it to both spin about its own axis, when turned by the races, and also to tilt relative to the races to vary the drive ratio. A control pinion (27) is also arranged between the sun and ring gears meshing with both. The control pinion is able to rotate about its own axis freely, but the pinion axis is fixed with respect to the housing.

8 Claims, 4 Drawing Sheets

(56) References Cited

FOREIGN PATENT DOCUMENTS

| WO | 2007065900 A1 | 6/2007 |
| WO | 2008120687 A1 | 10/2008 |

OTHER PUBLICATIONS

International Report on Patentability; International Application No. PCT/GB2009/051723; date of issuance of report Jun. 21, 2011.
First Office Action; State Intellectual Property Office, P.R. China; corresponding Chinese application No. 200980156761.3; date of Office Action Jan. 17, 2014.

CONTINUOUSLY VARIABLE TRANSMISSION

CROSS REFERENCE TO RELATED APPLICATION

This application is the U.S. national phase of PCT application no. PCT/GB2009/051723 filed 16 Dec. 2009 which claims priority to Japanese application JP 2008-319493 filed 16 Dec. 2008.

BACKGROUND OF THE INVENTION (1) Field of the Invention

The present invention relates to rolling-traction variators of the type in which drive is transmitted from one race to another by at least one roller whose orientation is variable in accordance with changes in variator drive ratio. More specifically it concerns such a variator in which the roller is mounted upon a carrier gear which is controlled through sun and ring gears.

(2) Description of Related Art

The word "variator" is used herein to refer to a device which transmits rotary drive from a rotary input to a rotary output at a continuously variable variator drive ratio (the ratio of the input's speed to the output's speed). Variators are particularly, but not exclusively, applicable in motor vehicle transmission applications. One known form of rolling-traction type variator uses at least two co-axially mounted races having opposed faces which are shaped so that the races together form an approximately toroidal space. At least one roller is positioned in the space between the races and runs upon their shaped faces to transmit drive from one race to the other. Changes in the inclination of the roller are associated with changes in the relative speeds of the races, and hence in the variator drive ratio.

Some mechanism is needed to control roller inclination, and the prior art contains numerous examples. Typically such mechanisms do not act by directly applying a torque to the roller's mountings to tilt the roller. Instead, the roller is mounted in such a manner that displacing it causes it to steer itself, due to the forces exerted on it by the races, to a new inclination. The steering effect arises because the roller seeks a position in which its own axis coincides with the common axis of the variator races, since in any other condition the motion of the roller is non-parallel to that of the races in the area where they engage with each other. The control mechanism serves to regulate the roller's displacement.

Examples of such mechanisms are found in the applicants' prior published patent cases including PCT/GB03/00259 (WO 03/062670) and JP2006-292079A. In many examples, the displacement needed to cause the roller to steer itself is along the circumferential direction (about the common axis of the variator races) and, by allowing the rollers to tilt about an axis which is inclined to the radial plane, a relationship is established between roller displacement and roller inclination. An actuator is provided for urging the roller along the circumferential direction and so influencing its displacement, and correspondingly influencing the variator ratio.

Figure 1A:
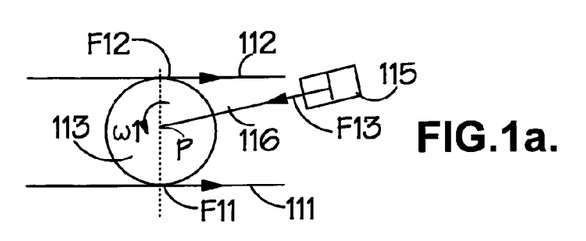
FIGS. 1a and 1b represent a balanced condition of the forces of a conventional type of toroidal continuously variable device, (a) being a view in the radial direction and (b) being a view in the axial direction.
Figure 1B:
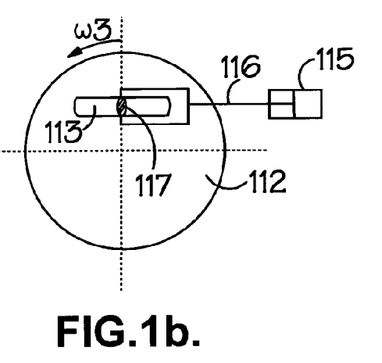
Figure 2A:
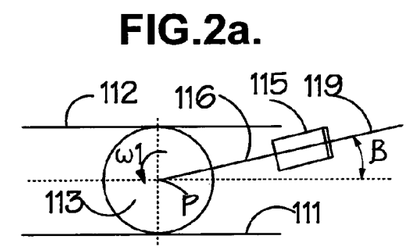
FIGS. 2a and 2b represent a conventional type of toroidal continuously variable device in the condition in which the power rollers are displaced, (a) being a view in the radial direction and (b) being a view in the axial direction.
Figure 2B:
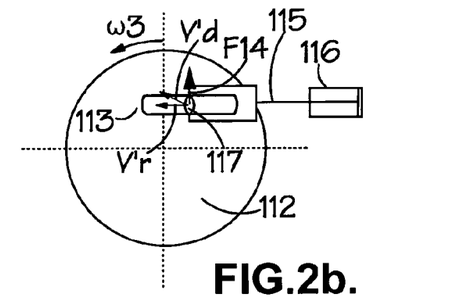
Figure 3A:
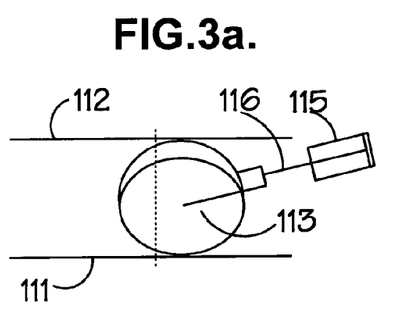
FIGS. 3a and 3b represent a conventional type of toroidal continuously variable device in the condition in which the power rollers are inclined, (a) being a view in the radial direction and (b) being a view in the axial direction.
Figure 3B:
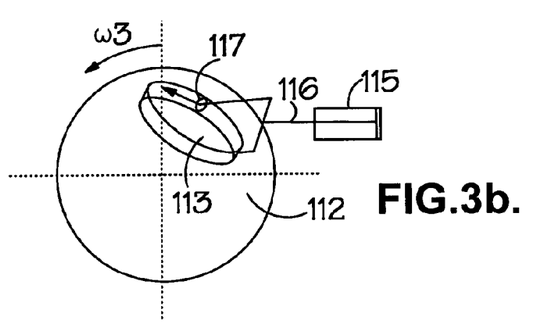

The principles are illustrated in FIGS. 1 to 3, which are highly simplified representations of a variator viewed along the direction of the races' common axis (FIGS. 1b, 2b and 3b) and along a direction radial to said axis (FIGS. 1a, 2a, 3a). The variator's input and output races 111, 112 are represented in the radial views by straight lines, although in a real variator they are, as noted above, shaped to form a substantially toroidal cavity, and in the axial views they are seen to be circular. Roller 113 (which is one of a set, although the others are omitted from the drawings for the sake of simplicity) is arranged between the input and output races 111, 112, which are urged toward one another to provide traction between the roller and the races. The roller is mounted in a carriage 116 in a manner which permits the roller to rotate freely about its own axis P. The carriage 116 is connected to a piston of a hydraulic actuator 115. Power can in principle flow in either direction through the variator—from input to output or vice versa. Consider the case in which power flows from input to output. In this case the input race 111 turns the roller 113 (its direction of rotation is indicated as w1 in the drawings) and the roller 113 drives the output race 112 (whose direction of rotation is shown as w3). A traction force F11 is applied to the roller 113 by the input race 111, which is driving the roller 113. A traction force F12 is applied to the roller by the output disc, which is driven by the roller 113. The sum of the traction forces F11+F12 is reacted through the hydraulic actuator 115 and must be balanced by the actuator's force.

A momentary imbalance between the traction forces F11+F12 and the force of the actuator 115 causes the roller 113 to move. Suppose for example that, starting from a condition in which the variator is in equilibrium, the force applied by the actuator 115 is reduced. The traction force F11+F12 will then momentarily dominate, and the roller will move toward the actuator 115, as seen in FIG. 2. Referring to FIG. 2b, if the velocity vector V'r of the roller 113 at the region 117 where it engages the output race 112 were to remain unchanged, it would then be non-parallel to the velocity vector V'd of the surface of the output race 112 in the same region. The result is a traction force vector F14 acting on the roller 113 tending to cause it to tilt. A similar action between the input race 111 and the roller 113 produces a traction force on the roller at its region of contact (not shown) with the input race, and the two forces on the roller 113 form a couple, producing a steering effect upon the roller 113. That is, the roller 113 is caused to tilt about a steering axis 119. Note that this steering axis 119 forms a castor angle B to the radial plane 118. As a result of this castor angle, the tilting motion of the roller 113 is able to restore parallelism of the vectors V'r and V'd. The roller thus tilts (as in FIG. 3b) until it reaches a position in which the said vectors are parallel, and the aforesaid couple is thus reduced to zero. As the roller moves back and forth, its tilt (and correspondingly the variator's drive ratio) varies accordingly.

The total torque that must be reacted from the rollers to the variator's housing is often referred to as the "reaction torque", and is equal to the sum of the torques upon the variator's input race 111 and output race 112. Note that this torque can only be reacted through the hydraulic actuators 115. Hence by regulating the hydraulic fluid pressures in the actuators 115, the reaction torque is directly regulated. The rollers automatically move to positions which cause the variator to generate a reaction torque corresponding to the said fluid pressures. It is thus the reaction torque that is directly regulated, and not the variator's actual drive ratio. This mode of control is thus sometimes referred to as "torque control".

A different arrangement for controlling the variator rollers is described in Torotrak (Development) Limited's published International patent applications WO2007/065900 and WO2005/121602, both of which disclose variators in which each of a set of rollers is carried upon a respective carrier gear which meshes with a radially inner sun gear and a radially outer ring gear in the manner of a planetary gear in an epicyclic gear train. In this type of arrangement, rotation of the sun gear relative to the ring gear causes the carrier gear to turn, and it is this turning of the carrier gear that causes the steering effect upon the roller needed to control the roller's tilt.

In this type of arrangement it is necessary to control the motion of the sun and ring gears in order to control the variator, and the aforementioned International patent applications contain various mechanisms for this purpose. Among these are arrangements in which one or a set of control pinions is provided which, like the carrier gears, mesh with the sun and ring. In particular, WO2007/065900 discloses an arrangement in which a control pinion (referred to therein as a planet) is coupled to a hydraulic actuator in a manner which enables the actuator to move the pinion back and forth, but prevents the pinion from rotating. In this way the actuator controls the positions of both sun and ring gears.

All the arrangements in this prior art document permit the control pinion(s) and the carrier gears to move back and forth about the common axis of the variator races, with the forces on the control pinions being reacted through, and hence controlled by, some form of actuator. In this way the reaction torque can be regulated.

SUMMARY OF THE INVENTION

When torque from a rotary power source (such as, for example, an engine) is transmitted from the input disc to the roller, a traction force (F11) acts, and when torque transmission is effected from the roller to the output disc, a traction force (F12) acts, so, in order to support the roller it is necessary to apply a reaction force (F13) that balances these traction forces (F11+F12). Consequently it is necessary to apply a reaction force to the power roller through the sun gear, ring gear and hydraulic servos.

An object of the present invention is to provide a variator of the aforementioned type, having sun and ring gears and a carrier gear on which the roller is mounted, in which the means used to drive the sun and ring are not required to react the variator reaction torque.

In accordance with a first aspect of the present invention, there is a variator comprising a housing, a pair of semi-toroidally recessed races each mounted to the housing for rotation about a variator axis, and a roller mounted between the races to transfer drive between them at a variable drive ratio, the variator further comprising:
 a sun gear between the races;
 a ring gear between the races, the ring gear being radially outward of the sun gear;
 a carrier gear which is disposed between the sun and ring gears and meshes with both, and upon which the roller is mounted in a manner which enables the roller to spin about its own axis and to tilt relative to the races to vary the drive ratio; and
 a control pinion which is disposed between the sun and ring gears and meshes with both, the variator being characterised in that
 the control pinion is mounted to the housing in a manner which permits it to rotate freely about a pinion axis but prevents the pinion axis from moving with respect to the housing.

According to a second aspect of the present invention there is a variator (2) comprising:
 a casing (6),
 a power roller (14) gripped between two discs (11, 12), namely an input disc (11) and an output disc (12);
 a sun gear (25A, 25B) provided between the two discs (11, 12), on the circumferentially inward side;
 a ring gear (26A, 26B) provided between the two discs, on the circumferentially outward side; and
 a planet gear (33) having a rotation and inclination support part (31) which supports the power roller (14) in a freely rotatable fashion and with freedom to incline relative to the two discs (11, 12), and having a support shaft (32) which supports the rotation and inclination support part (31) and which at one end meshes with the sun gear (25A, 25B) and at the other end meshes with the ring gear (26A, 26B)
characterised in that:
the variator (2) comprises:
rotational drive means (29) which drives in rotation at least one or other of the sun gear (25A, 25B) and ring gear (26A, 26B);
a control pinion (27) which is positioned between the sun gear (25A, 25B) and the ring gear (26A, 26B), and which at one end meshes with the sun gear (25A, 25B) and at the other end meshes with the ring gear (26A, 26B); and
a carrier (28) which supports the control pinion (27) in a freely rotatable fashion, and in that
in altering the gear ratio in the toroidal type of continuously variable device (2), when the angle of inclination of the support shaft (32) of the planet gear (33) is altered by driving the sun gear (25A, 25B) and the ring gear (26A, 26B) in rotation in respectively opposite directions via the control pinion (27) by means of the rotational drive means (29), the angle of the power roller (14) relative to the rotational direction of the two discs (11, 12) is altered via the rotation and inclination support part (31), and, because of the resulting difference in the rotational direction of the angle-altered power roller relative to the two discs (11, 12) at the contact regions (17), its attitude is automatically altered in such a way that the power roller is inclined in a direction whereby the contact radii of the contact regions (17) are altered and at the same time returns to a direction tangential to the rotational direction of the two discs (11, 12);
and also in that
the carrier (28) is secured to the casing (6).

Preferably the rotational drive means consists of a motor (29).

Preferably the rotation and inclination support part (31) has:
 a central support part (35) which is fixedly supported on the support shaft (32) and which is formed in the shape of a cylinder centred on a first axis (I) given a caster angle (γ) with respect to an axis (H) orthogonal to the support shaft;
 a roller rotational support part (37) which is supported with freedom of rotation with respect to a cylindrical arcuate surface (36) of the central support part (35), and which is formed in the shape of a cylinder centred on a second axis (J) orthogonal to the first axis (I); and
 the power roller (14) is supported with freedom of rotation, centred on the second axis (J), with respect to an arcuate surface (38) of the cylindrical shape of the roller rotational support part (37);
 the rotation and inclination support part (31) supports the roller rotational support part (37) and the power roller (14) by means of cylindrical parallel surfaces of the central support part (35), and when the support shaft (32) is inclined by rotational control of the planet gear (33), makes the power roller (14) incline relative to the rotational direction of the two discs (11, 12), and, when the power roller is made to incline in a direction which changes the contact radius of the contact regions (17) due to the difference in the rotational direction at the contact regions (17), the power roller is made to incline about the first axis (I), by means of the cylindrical arcuate surface (36) of the central support part (35), and at the same time is made to return to a direction tangential to the rotational direction of the two discs (11, 12) in accordance with the caster angle.

In the variator according to the invention, movement of the power rollers in the circumferential direction relative to the two discs can be eliminated, so the carriers that support the control pinions in a freely rotatable fashion can be fixed to the casing.

BRIEF DESCRIPTION OF THE DRAWINGS

Specific embodiments of the present invention will now be described, by way of example only, with reference to the accompanying drawings, in which: —

DETAILED DESCRIPTION OF THE PREFERRED EMBODIMENT

Figure 4:
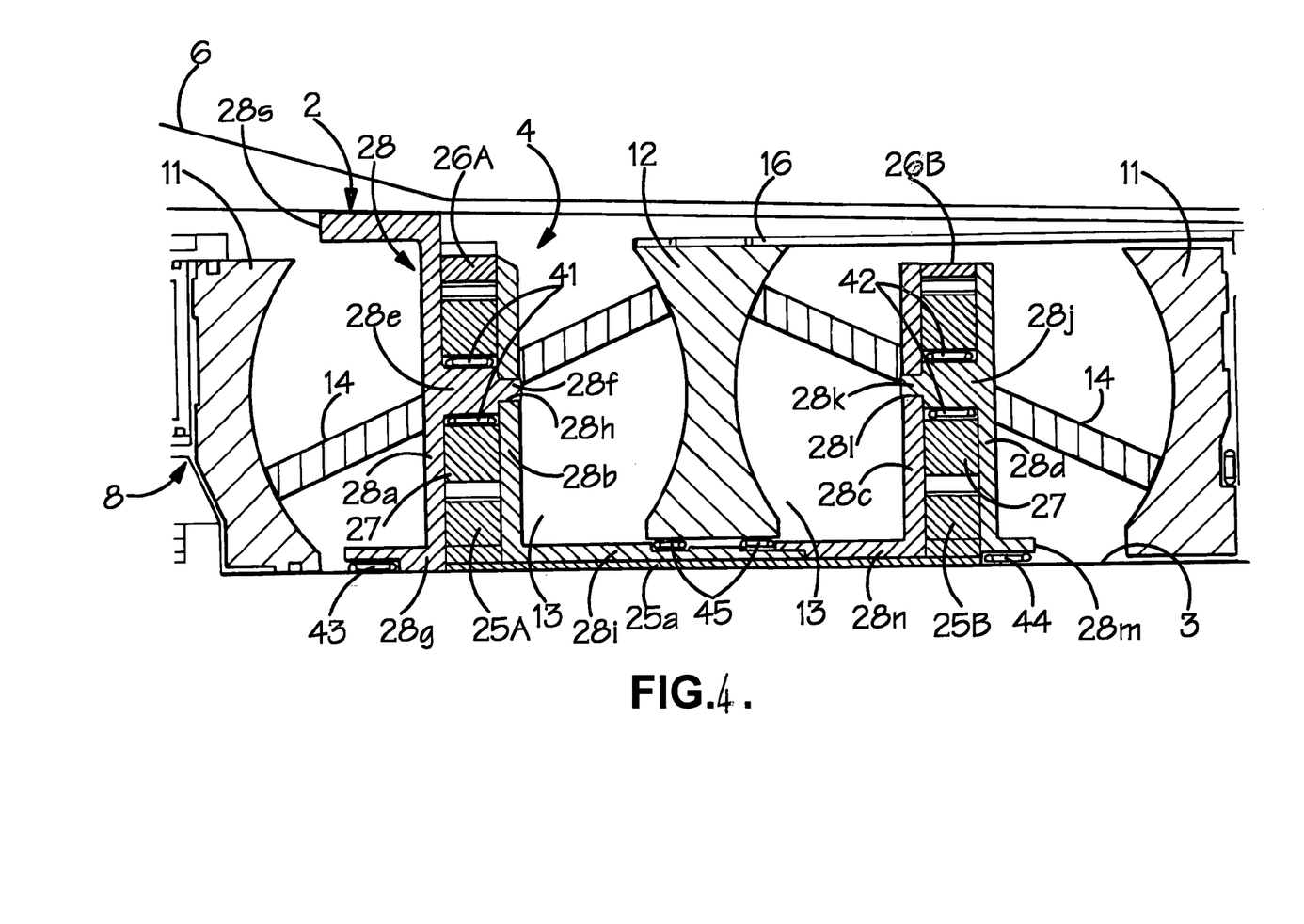
FIG. 4 is a section in an axial plane through a variator according to the present invention.
Figure 5:
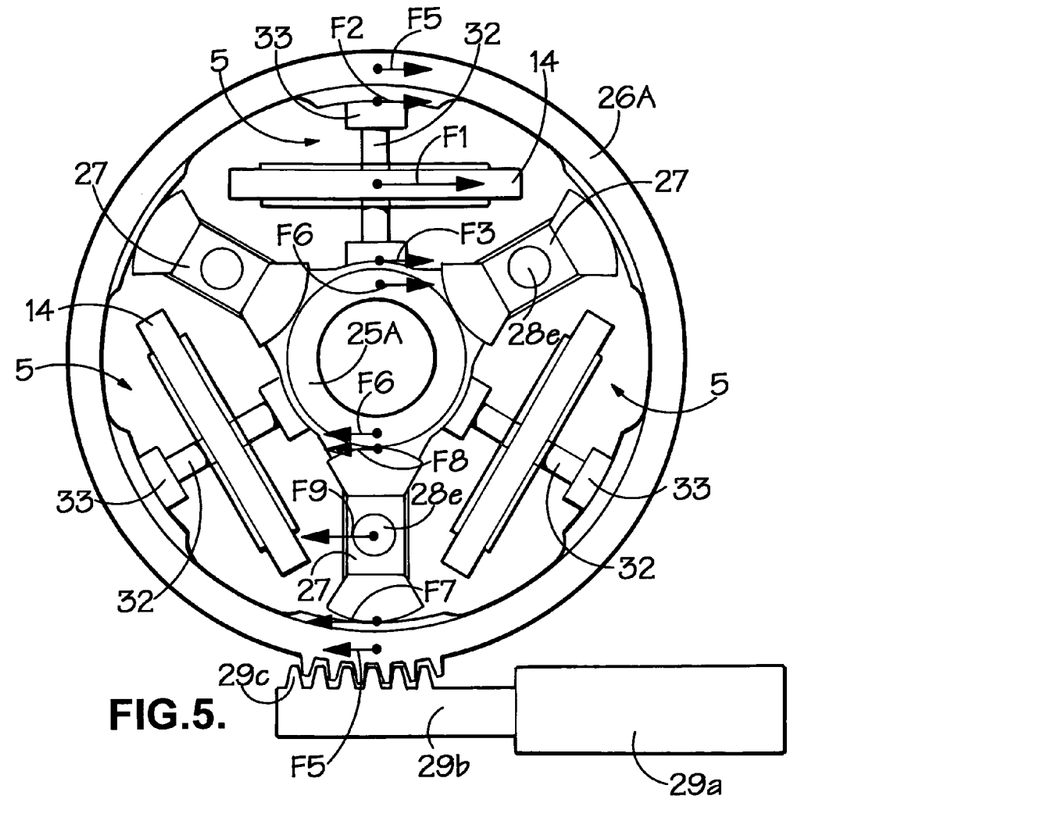
FIG. 5 is a section in a radial plane through a variator according to the present invention.

The variator 2 seen in FIGS. 4 and 5 is of double cavity, full toroidal type. It may be used in a motor vehicle transmission, and in this context it may be combined with a known type of planetary gear (not depicted herein) to provide both forward and reverse drive, and in suitable cases to provide two or more "regimes"—i.e. two or more different transmission ratio ranges.

The variator 2 has a pair of input races 11 mounted upon an input shaft 3 to rotate along with it. The input shaft 3 forms the variator's rotary input in this embodiment and may for example be coupled through suitable gearing to a source of rotary drive such as an internal combustion engine. An output race 12 is connected at its outer periphery to an output member 16 which forms the variator's output and may for example be coupled to gearing leading to the wheels of a motor vehicle. Roller units 5 (see FIG. 6), to be described in detail later, each comprise a roller 14 that is arranged between one of the input races 11 and the output race 12. Each of the input races 11 has a semi-toroidally recessed surface upon which the associated rollers 14 run. The output race 12 has two semi-toroidally recessed faces so that the races together form two generally toroidal cavities containing the rollers 14. For the sake of simplicity FIG. 4 shows only a single roller 14 in each cavity, but in practice a plurality of rollers 14 (for example three power rollers in each cavity) are arranged at regular intervals about the cavities' circumferences. In order to provide traction between the rollers 14 and the races 11, 12 they must be biased into engagement with one another. In a manner known in the art, this is achieved by means of a hydraulic actuator 8 which acts upon one of the input races 11, urging it along the input shaft 3 toward the other races. The other of the input races 11 is prevented from moving along the shaft 3, so that the force of the actuator 8 is transmitted through the rollers 14 and the output race 12 to the shaft 3.

A roller control device 4 controls the inclination of the rollers 14. Thus continuous (stepless) variation of the variator drive ratio can be achieved by alteration of the radii at which the rollers 14 engage with the input discs 11 and the output disc 12. The output disc 12 rotates in the opposite direction to the input discs 11, so the variator drive ratio is negative.

The roller control device 4 is formed as follows. Sun gears 25A, 25B are arranged circumferentially inwards of the respective rollers 14, being supported in a freely rotatable fashion on the input shaft 3 and linked by a sleeve member 25a passing through the output race 12, so that the sun gears 25A, 25B rotate together. Ring gears 26A, 26B are arranged circumferentially outwards of the respective rollers 14 and supported in a freely rotatable fashion with respect to the input shaft 3.

A pinion mounting part 28 is fixed with respect to the transmission casing 6 and supports in a freely rotatable fashion control pinions 27 that are arranged between the sun gears 25A, 25B and the ring gears 26A, 26B, to mesh with both. In addition, the roller control device 4 includes the roller units 5 referred to above and a motor unit 29 (see FIG. 5) constituting a rotary drive means that drives the ring gear 26A in rotation.

The carrier 28 comprises a front main carrier plate 28a, a front subcarrier plate 28b, a rear subcarrier plate 28c, and a rear main carrier plate 28d. The front main carrier plate 28a is formed on its circumferentially inward side with a sleeve 28g. The sleeve 28g is supported in a freely rotatable fashion on the input shaft 3 by means of a bearing 43. The front main carrier plate 28a is formed on its circumferentially outward side with a connecting part 28s. The connecting part 28s is fixed to the inside face of the transmission casing 6. In addition, the front main carrier plate 28a is integrally formed with pinion shafts 28e. Control pinions 27, to be described, are supported thereon in a freely rotatable fashion by means of bearings 41.

The front subcarrier plate 28b is formed with holes 28h into which are fitted projections 28f that are formed on the pinion shafts 28e, and is thereby fixed with respect to the main carrier plate 28a by means of the holes 28h. Also, the front subcarrier plate 28b is formed with a sleeve 28i on the circumferentially inward side thereof and is arranged so as to be on the circumferentially outward side of the sleeve member 25a.

The rear main carrier plate 28d is formed with a sleeve 28m on the circumferentially inward side thereof. The sleeve 28m is supported in a freely rotatable fashion on the input shaft 3 by means of a bearing 44. Also, pinion shafts 28j are integrally formed on the rear main carrier plate 28d and the control pinions 27 are supported in a freely rotatable fashion thereon by means of bearings 42.

The rear subcarrier plate 28c is formed with holes 28l into which are fitted projections 28k that are formed on the pinion shaft 28j and is thereby fixed with respect to the rear main carrier plate 28d by means of the holes 28l. The rear subcarrier plate 28c is formed on its circumferentially inward side with a sleeve 28n arranged so as to be on the circumferentially outward side of the sleeve member 25a. The front subcarrier plate 28b and the rear subcarrier plate 28c are linked on the circumferentially inward side of the output disc 12 and in this way the carrier 28, which is constituted by the front main carrier plate 20a, the front subcarrier plate 28b, the rear subcarrier plate 28c and the rear main carrier plate 28d, is fixed with respect to the transmission casing 6. Also, at the portion where the front subcarrier plate 28b and the rear subcarrier plate 28c are linked, the output disc 12 is supported in a freely rotatable fashion by means of bearings 45.

The control pinions 27 on the left side of FIG. 4 are arranged between adjacent power rollers 14 in the cavity 13 and mesh with the sun gear 25A and the ring gear 26A. They are supported in a freely rotatable fashion by means of the bearings 41, on the pinion shafts 28e that are integrally formed with the carrier 28. Similarly, the control pinions 27 on the right side of FIG. 4 are arranged between adjacent rollers 14 in the cavity 13 and mesh with the sun gear 25B and the ring gear 26B. They are supported in a freely rotatable fashion by means of the bearings 42, 42 on the pinion shaft 28j that is integrally formed with the carrier 28.

Figure 6:
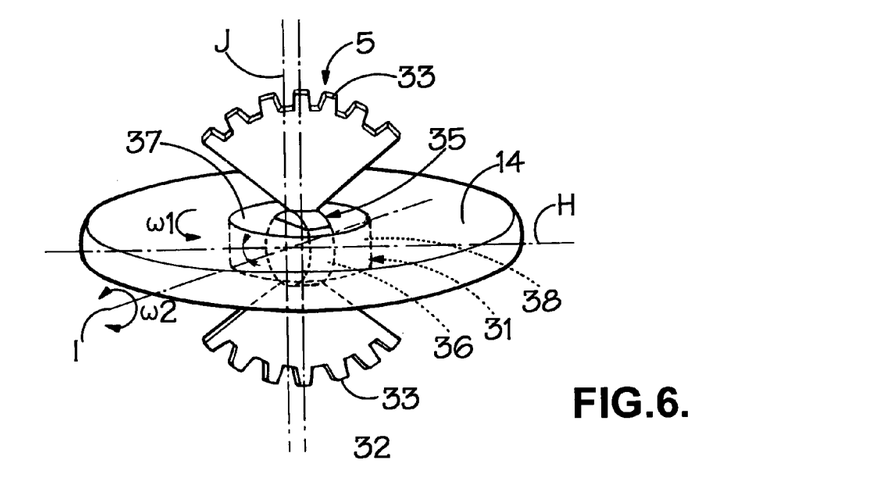
FIG. 6 is a perspective view of a roller unit.

In the present embodiment six roller units 5 as described above are arranged in the two cavities (three per cavity). All of the roller units 5 are constructed in the same way. As shown in FIG. 6, the roller units 5 have a shape in which the range of movement of the aforesaid power roller 14 is cut out from an annular gear, and comprise: a planet gear 33 whose circumferentially inward side (the lower side in FIG. 4) meshes with the sun gear 25A (25B) and whose circumferentially outward side (the upper side in FIG. 4) meshes with the ring gear 26A (26B); and a rotation and inclination support part 31 that is fixed and supported by the central portion of this planet gear 33 and supports the power rollers 14 in freely rotatable fashion in the ω1 direction and with freedom to incline in the ω2 direction.

The rotation and inclination support part 31 comprises a central support part 35 and roller rotation support part 37. This central support part 35 is integrally formed with a support shaft 32 and is formed in cylindrical shape centred on an axis (the first axis) I that is inclined by a caster angle γ in a plane orthogonal to the support shaft 32 from an axis H parallel with the two discs 11, 12 and orthogonal to this support shaft 32. The roller rotational support part 37 is formed in a cylindrical shape centred on an axis (the second axis) J constituting the axis of rotation of the power roller 14 and orthogonal to the above-mentioned axis I, and is supported in a freely rotatable fashion with respect to the cylindrically shaped arcuate surface 36 of this central support part 35. Also, the roller rotational support part 35 supports in a freely rotatable fashion a roller 14 that rotates about the axis J, by means of a cylindrical arcuate surface 38 thereof.

As shown in FIG. 5, the motor unit 29 is arranged below the variator 2 within the transmission casing 6 and comprises a drive section 29a constituted by a stepping motor, and a rack 29b. In the drive section 29a there is provided a rotor (not shown) that is controlled in accordance with the operating conditions of the vehicle, based on a signal from an electronic control device, not shown. The rack 29b is connected with the rotor through a screw mechanism (not shown) that converts rotary motion into linear motion. The rack 29b is a rack-shaped member that is formed with a plurality of teeth 29c on its upper surface. The teeth 29c mesh with external teeth 26a formed on the outer circumference of the ring gear 26A.

Figure 7A:
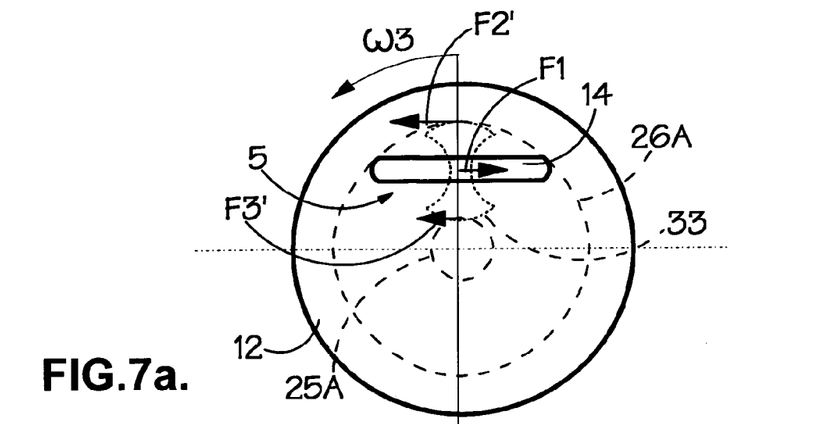
FIGS. 7a-7c illustrate parts of the variator, (a) representing the roller positions at a variator ratio of −1, (b) being a view of the condition in which the roller units are rotated, and (c) being a view of a condition in which the rollers are inclined.

Next, the operation of the variator 2 will be described with reference to FIG. 7.

When the variator 2 is mounted in a vehicle, rotation of the input shaft 3 that is connected with the output shaft of the engine is transmitted to the input discs 11 of the variator 2. The power rollers 14 are rotated by the rotation of the input discs 11, and the output disc 12 is rotated in the direction ω3 as shown in FIG. 7(a) by this rotation. When this happens, the traction force F1 that is generated when torque is transmitted from the input discs 11 to the output disc 12 acts on the power rollers 14 in the cavities 13 and this traction force F1 is in balance with the reaction forces F2', F3' received by the ring gear 26A and sun gear 25A.

Figure 7B:
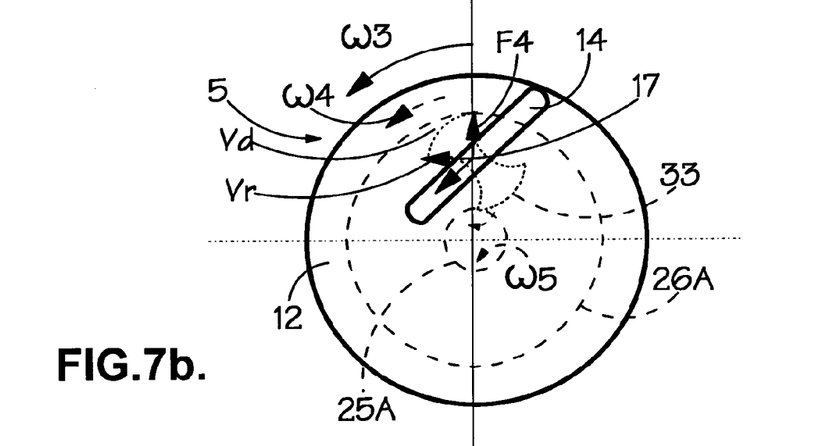
Figure 7C:
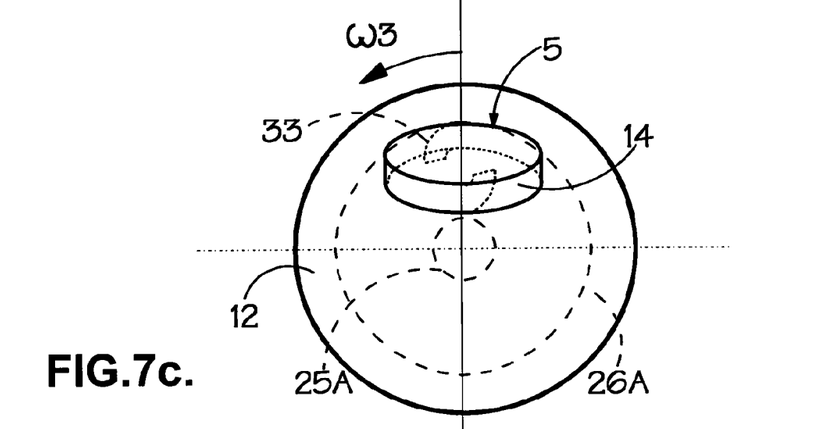

FIG. 7(b) shows what happens when, for example, the ring gear 26A is driven in rotation by the motor unit 29 in the ω4 direction. The planet gear 33 of the roller units 5 is rotated in the same direction as the ring gear 26A and the control pinion 27 is rotated about the pinion shaft 28e of the carrier 28, causing the sun gear 25A that is meshed therewith to be rotated in the ω5 direction, which is the opposite direction to that of the ring gear 26A. Consequently, the power roller units 5 are rotated in the ω4 direction from the ring gear 26A and rotated in the ω5 direction from the sun gear 25A, so that the power roller units rotate (by themselves) to their original position and the angles of the support shafts 32 of the roller units 5 are altered as shown in FIG. 7(b). At this point, the rollers 14 are inclined towards the rotational direction ω3 of the output disc 12 together with the roller rotational support part 37, by means of the cylindrically shaped parallel faces that are provided on the central support part 35 of the rotation and inclination support part 31.

When this happens, at the contact regions 17 of the output disc 12 and the power rollers 14, the velocity vector Vr of the power roller 14 is facing more towards the circumferentially inward side than the tangential direction of the output disc 12, while the velocity vector Vd of the output disc 12 is in the tangential direction of this output disc 12. Consequently, the velocity vector Vd of the output disc 12 and the velocity vector Vd of the power roller 14 become non-parallel. Furthermore, at the contact regions 17, a traction force F4 in the same direction as the difference of the velocity vector Vd and the velocity vector Vr is generated, which traction force F4 acts on the power rollers 14.

A similar action takes place between the power rollers 14 and the input discs 11, but a traction force that is in the opposite direction to the traction force F4 acts on the power rollers 14. By the action of this traction force that is generated between the rollers 14 and the input discs 11 and the traction force F4, as shown in FIG. 4(c), the axis of rotation J of the rollers 14 (see FIG. 6) is tilted about the axis I along the arcuate surface 36 provided on the central support part 35, and the rollers 14 are brought into positions, by the action of the caster angle γ, in which the velocity vector Vr of the power roller 14 and the velocity vector Vd of the output disc 12 become parallel. In other words, the transmission ratio (contact radii) of the output disc 12 with respect to the input discs 11 are automatically changed.

Next, the balance of forces in the variator 2 will be described. Even when the variator 2 is at a fixed transmission ratio in which no transmission ratio control is being performed, a traction force F1 is generated on the rollers 14 whilst torque transmission is being performed between the input discs 11 and the output disc 12. As shown in FIG. 5, the traction force F1 can be divided into a force F2 that acts at the circumferentially outward region of the variator 2 on the planet gear 33 and a force F3 that acts on the circumferentially inward region of the variator 2 on the planet gear 33.

The force F2 is transmitted to the ring gear 26A as a force F5 tending to rotate the ring gear 26A in the clockwise direction in FIG. 5, through the meshing of the planet gear 33 with the ring gear 26A. The force F5 that is transmitted to the ring gear 26A is transmitted to the control pinion 27 as a force F7 tending to rotate the control pinion 27 in the clockwise direction in FIG. 5 through the meshing of ring gear 26A and the control pinion 27.

Furthermore, the force F3 is transmitted to the sun gear 25A as a force F6 tending to rotate the sun gear 25A in the clockwise direction in FIG. 5, through the meshing of the planet gear 33 and the sun gear 25A. The force F6 that is transmitted to the sun gear 25A is transmitted to the control pinion 27 as a force F8 tending to rotate the control pinion 27 in the anticlockwise direction in FIG. 5, by meshing of the sun gear 25A with the control pinion 27.

Forces F7 and F8 tend to rotate the control pinion 27 in mutually opposite directions, i.e. they constitute a force F9 that acts on the pinion shaft 28e, tending to move the control pinion in the clockwise direction in FIG. 5 (the direction of rotation of the input discs 11). The force F9 acts on the transmission casing 6 (see FIG. 4) through the carrier 28.

Force F9 is the sum of F7 and F8, which are of the same magnitude as the forces F2, F3 that were resolved from the traction force F1 as described above, so it is of the same magnitude as the traction force F1. Furthermore, the fraction forces F1 and F9 can be placed in a balanced condition (in which they do not rotate the planet gear 33 and control pinion 27) since the centre of rotation of the planet gear 33 (rollers 14) on which they respectively act, and the pinion shafts 28e are at substantially the same radius as the input discs 11. In other words, all of the traction forces F1 that are generated on the rollers 14 act on the transmission casing 6, so all of the reaction force in respect of these transmission forces F1 can be borne by the transmission casing 6.

It should be noted that, although the reactions to these fraction forces F1 to F9 are omitted from FIG. 5, these reactions are the reaction forces F1' to F9' and can be represented by arrows in the opposite direction to the respective arrows that are shown. More specifically, the reaction forces F2', F3' are shown in order to describe the forces acting on the roller units 5, as illustrated in FIG. 7(a).

When the variator 2 performs transmission ratio control, rotational drive of the ring gear 26A is effected by the motor unit 29 as described above, while torque is transmitted between the input discs 11 and the output disc 12. Although the ring gear 26A is driven in rotation by the motor unit 29 so that the planet gear 33 and control pinion 27 are rotated, there is no change in the respective meshing positions of the planet gear 33 and control pinion 27 and of the ring gear 26A and sun gear 2A. Therefore, as mentioned above, the force relationship is unchanged in that the reactions to the traction forces F1 generated on the power rollers 14 are borne by the transmission casing 6. Consequently, the drive force provided by the motor unit 29 can drive the ring gear 26A without needing to bear these reaction forces. Mechanisms such as a hydraulic servo or hydraulic circuitry in motor unit 29, are therefore not required to output a drive force that is larger than the traction force F1.

It should be noted that, in the variator 2 according to the present embodiment, control pinions 27 are arranged between the rollers 14 so that no movement of the power rollers 14 in the direction of rotation of the two discs 11 and the disc 12 takes place when transmission ratio control of the roller units 5 that support the rollers 14 is performed. There is therefore no risk of fouling of the power rollers 14 and control pinions 27.

In the variator 2 described above, the carrier 28, immovably mounted with respect to the transmission casing 6, supports control pinions 27 meshing with the sun gears 25A, 25B and ring gears 26A, 26B in a freely rotatable fashion. Consequently, even when a traction force F1 acts on the rollers 14, causing reaction to be transmitted through the planet gear 33 to the sun gears 25A, 25B and ring gears 26A, 26B, the reaction of the traction force F1 transmitted to the sun gears 25A, 25B and ring gears 26A, 26B is referred to the transmission casing 6 through the control pinions 27 and carrier 28. In this way, the reaction to the traction force F1 can be borne by the transmission casing 6 and it becomes unnecessary for the motor unit 29 to react the traction force F1 produced by the rollers 14. In this way, mechanisms (hydraulic servo and/or hydraulic circuitry etc) for outputting larger drive force than the traction force F1 can be made unnecessary, making it possible to make the variator 2 more compact.

The traction force F1 produced by the power rollers 14 is reacted by the transmission casing 6, even when the transmission force F1 varies in accordance with unpredictable operating conditions. It therefore becomes unnecessary to perform output control of the reaction force produced by the motor unit 29 so as to track the traction force F1. Thus, a control mechanism for performing complicated control such as, for example, feedback control is made unnecessary and simplification and cost reduction can thus be achieved.

Also, since the rotary drive means is constituted by a motor, a simple construction can be adopted. Also, in particular if a stepping motor, i.e. a motor that is capable of controlling its own position in response to an electrical instruction, is employed for the motor unit 29, a device for performing feedback by detecting the position of, for example, the sun gears 25A, 25B or ring gears 26A, 26B becomes unnecessary, so the variator 2 can be simplified and costs can be reduced.

Also, the rotation and inclination support part 31 can incline the rollers 14 with respect to the direction of rotation of the two discs 11, 12 by means of the cylindrically shaped parallel faces of the central support part 35, when the support shaft 32 is inclined by rotational control of the planet gear 33, and can subsequently, incline the power rollers 14 and return the power rollers 14 in the tangential direction of the direction of rotation of the two discs 11, 12, in accordance with the caster angle γ, by means of the cylindrically shaped arcuate surfaces 36 of the central support part 35, when these power rollers 14 are inclined in a direction with altered contact radii of the contact regions 17 by the difference in direction of rotation at the contact regions 17. It is therefore possible to alter the contact radii of the power rollers 14 with respect to the two discs 11, 12 and return the power rollers 14 automatically in the tangential direction of the direction of rotation of the two discs 11, 12, without moving the centre of rotation of the power rollers 14, simply through rotational control of the planet gear 33. In this way, movement of the power rollers 14 in the circumferential direction relative to the two discs 11, 12 can be eliminated, so the carriers 28 that support the control pinions 27 in a freely rotatable fashion can be fixed to the casing 6.

In the example described above the ring gear was driven in rotation by the rotational drive means. The present invention could also be applied in a construction in which the sun gear, or sun gear and ring gear are driven in rotation by the rotational drive means.

The rotational drive means need not necessarily be a motor unit 2 having a stepping motor and screw mechanism. For example, a hydraulic servo could be employed.

The invention claimed is:

1. A variator comprising a housing, a pair of semi-toroidally recessed races each mounted to the housing for rotation about a variator axis, and a roller mounted between the races to transfer drive between them at a variable drive ratio, the variator further comprising:
   a sun gear between the races;
   a ring gear between the races, the ring gear being radially outward of the sun gear;
   a carrier gear which is disposed between the sun and ring gears and meshes with both, and upon which the roller is mounted in a manner which enables the roller to spin about its own axis and to tilt relative to the races to vary the drive ratio; and a control pinion which is disposed between the sun and ring gears and meshes with both, the control pinion being mounted to the housing in a manner which permits the control pinion to rotate freely about a pinion axis which does not move with respect to the housing, thereby enabling roller loads to be delivered to the housing through the pinion axis, the pinion axis being located between the sun gear and the ring gear, the pinion axis being spaced apart from an axis of the sun gear.

2. A variator as claimed in claim 1 further comprising a rotary drive for turning at least one of the sun and the ring gear.

3. A variator as claimed in claim 2 in which the rotary drive is adapted to move the sun and/or ring gear to a selected position.

4. A variator as claimed in claim 3 in which the rotary drive comprises a stepper motor.

5. A variator as claimed in claim 1 in which the rotary drive comprises a rack and pinion mechanism.

6. A variator as claimed in claim 1 in which the control pinion is mounted on a carrier part which is fixed with respect to the housing.

7. A variator as claimed in claim 1 in which the roller's mounting enables the roller to tilt about a tilt axis which is inclined to a plane radial to the variator axis by a castor angle.

8. A variator comprising a housing, a pair of semi-toroidally recessed races each mounted to the housing for rotation about a variator axis, and a roller mounted between the races to transfer drive between them at a variable drive ratio, the variator further comprising:

a sun gear between the races;

a ring gear between the races, the ring gear being radially outward of the sun gear;

a carrier gear which is disposed between the sun and ring gears and meshes with both, and upon which the roller is mounted in a manner which enables the roller to spin about its own axis and to tilt relative to the races to vary the drive ratio; and a control pinion which is disposed between the sun and ring gears and meshes with both, the control pinion being mounted to the housing between the sun and ring gears and meshes with both in a manner which permits the control pinion to rotate freely about a pinion axis which does not move with respect to the housing, thereby enabling roller loads to be delivered to the housing through the pinion axis, the pinion axis being located between the sun gear and the ring gear, the pinion axis being spaced apart from an axis of the sun gear so that forces driving the sun and ring gears are not required to influence variator reaction torque.

* * * * *